Sept. 30, 1924.
F. C. CHRISTMAN
AUTOMOBILE HOIST
Filed Sept. 5, 1923
1,510,209
2 Sheets—Sheet 1
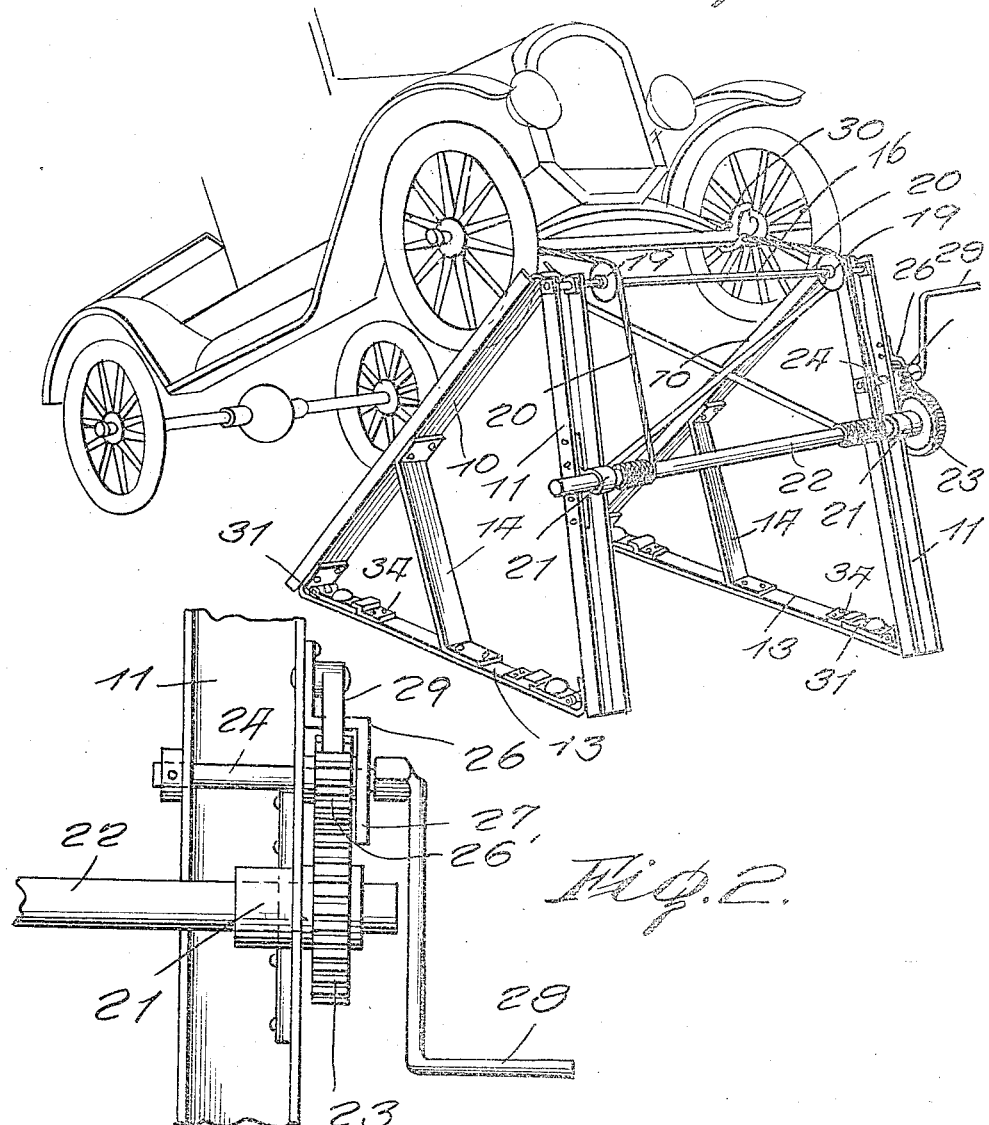
INVENTOR.
ATTORNEY.

Sept. 30, 1924.  
F. C. CHRISTMAN  
AUTOMOBILE HOIST  
Filed Sept. 5, 1923  
1,510,209  
2 Sheets-Sheet 2
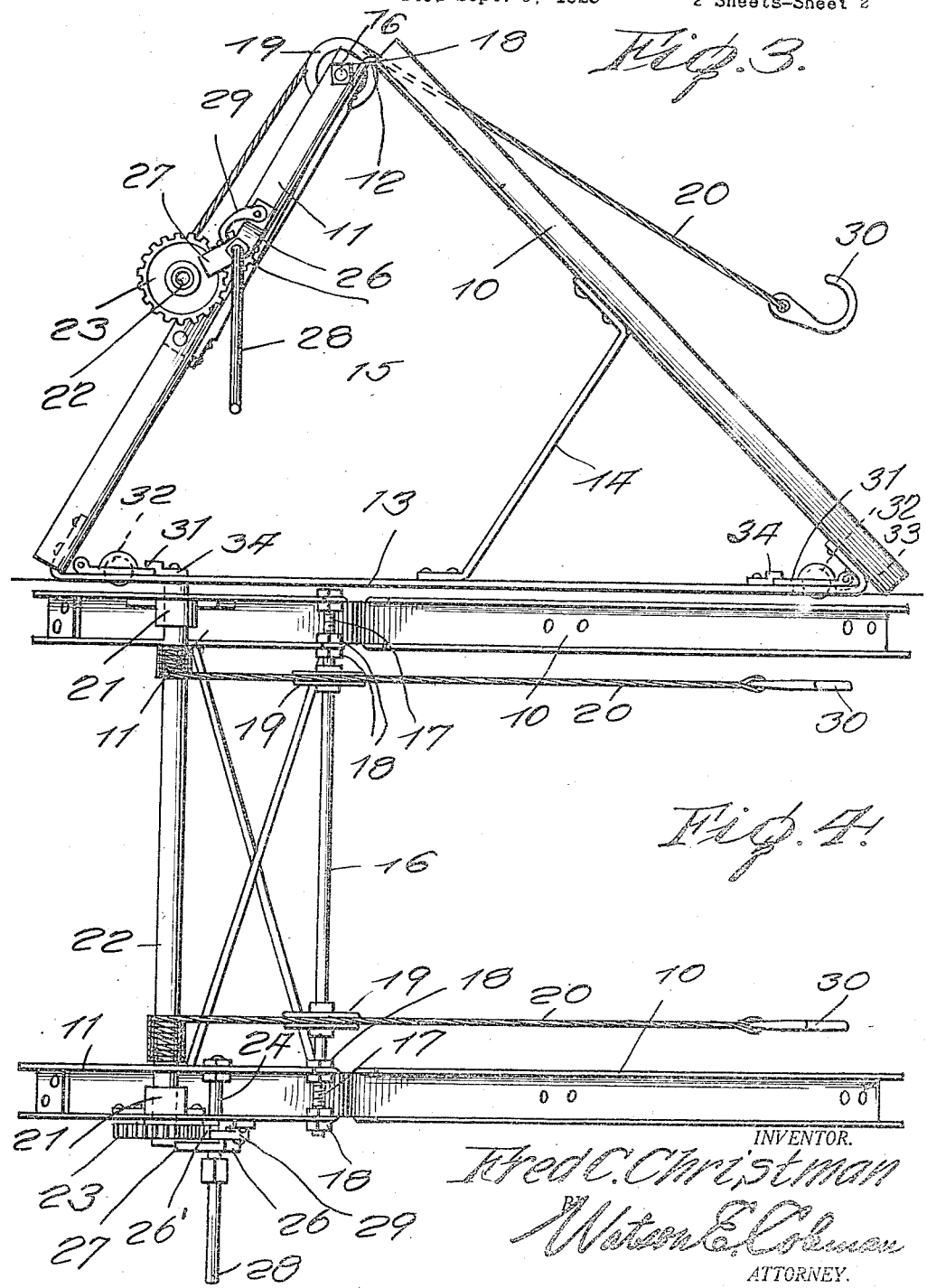

Patented Sept. 30, 1924.

1,510,209

UNITED STATES PATENT OFFICE.

FRED C. CHRISTMAN, OF GALION, OHIO.

AUTOMOBILE HOIST.

Application filed September 5, 1923. Serial No. 661,082.

*To all whom it may concern:*

Be it known that I, FRED C. CHRISTMAN, a citizen of the United States, residing at Galion, in the county of Crawford and State of Ohio, have invented certain new and useful Improvements in Automobile Hoists, of which the following is a specification, reference being had to the accompanying drawings.

This invention relates to automobile hoists and more particularly to a hoist for elevating an end of an automobile so as to render certain parts thereof readily accessible for removal, repair or the like.

An important object of the invention is to produce a device of this character which is extremely simple in its construction and operation and which is capable of use with the majority of automobiles.

A further object of the invention is to produce a device of this character having a simple, durable and efficient hoist mechanism associated with an inclined run-way for receiving and guiding the wheels of an automobile, in order that an axle of the automobile may be engaged by the hoisting mechanism and the end at which the axle is disposed elevated to render the same convenient for access.

These and other objects I attain by the construction shown in the accompanying drawings wherein for the purpose of illustration is shown a preferred embodiment of my invention and wherein:—

Figure 1 is a perspective view of a hoist constructed in accordance with my invention showing an automobile in position thereon;

Figure 2 is a detail rear elevation of the hoisting mechanism;

Figure 3 is a side elevation of the hoist taken from the hoist operating side thereof; and Figure 4 is a plan view thereof.

Referring now more particularly to the drawings, the numeral 10 indicates an inclined run-way formed of channel iron of a suitable gauge and width, the run-way consisting of a pair of irons spaced apart a distance equal to the standard spacing of automobile wheels. At their upper ends the run-way sections 10 are connected to brace sections 11 which are preferably likewise formed of channel iron and may, if so desired, be formed from a single piece of channel iron with the associated run-way member 10 by simply splitting the flanges thereof and bending, as indicated at 12. The lower ends of the run-way sections 10 are connected with their corresponding brace sections 11 by a ground brace 13 which lies flatly upon the ground and has its end portion bent upwardly and secured to the bight portion of the channel irons by any suitable means such as rivets, bolts or the like. Each run-way section 10 has the under surface of its bight portion engaged by the upper end of a brace member 14, these braces engaging the run-way section approximately midway of their ends and the lower ends of the braces being secured to the ground brace at a point well spaced from the lower ends of the brace sections 11 so that a large and conveniently sized opening 15 is provided by means of which the operator may enter beneath the suspended machine.

Directed through aligned openings formed in the flanges of the brace members 11 at or adjacent the upper ends thereof is a shaft 16. The ends of this shaft or that portion thereof projecting through the flanges are screw-threaded, as indicated at 17, and the shaft is held rigidly in position as against rotation or longitudinal movement by means of securing nuts 18 abutting each flange of the brace member 11. Rotatably mounted upon the shaft 16 adjacent each brace member and capable of movement longtudinally of the shaft 16 are guide pulleys 19 having their peripheries grooved for the reception of a cable 20 or other suitable flexible draught member.

Secured to the brace members by bolting or the like to the flanges thereof at a point spaced below the shaft 16 are a pair of bearings 21 in which is rotatably mounted a shaft 22. At one end this shaft is provided with a gear 23 which is secured against rotation with relation thereto. One side of the hub of this gear abuts the adjacent face of the adjacent bearing member 21. Rotatably directed through the flanges of the brace member bearing the last named gear is a stub shaft 24, the outer end of which has mounted thereon a pinion 25 meshing with the gear 23. Secured to the outer flange adjacent the pinion 25 is a bracket member 26 having an opening formed therein through which the stub shaft is rotatably directed. This bracket has its end portion not only overlying the pinion 25 but is likewise provided with an extension 27 overlying the rim portion of the gear 23 and holding the same at all times against the adjacent bearing 21. It will be seen that this bracket not only provides a means for preventing movement of the stub shaft 24 and its pinion 25 but likewise prevents longitudinal movement of the shaft 22 in one direction. Movement of the shaft 22 in the opposite direction being prevented by the bearing.

The outer end portion of the stub shaft 24 is preferably squared for the reception of a removable operating handle 28 by means of which the stub shaft and pinion and accordingly the shaft 22 may be rotated. In order that the shaft 22 may be held in applied position I pivot upon the bracket 26 a swinging pawl 29 which may be engaged with the teeth of the pinion when the proper adjustment has been secured. During adjustment this pawl will, of course, be swung back out of the way so as not to interfere with operation in any manner. The cables 20 have one end thereof secured to the shaft 22 and have their free ends provided with hooks 30 or other suitable means for engaging the axle of a vehicle which is to be drawn upon the hoist.

In the operation of the device the automobile is either moved so that its wheels are engaged against the lower ends of the runways 10 or the hoist is moved into adjusted position to the automobile. In order to facilitate movement of the hoist I provide upon the ground braces 13 adjacent the point of attachment thereof to the lower ends of the run-ways and to the associated braces pivoted plates 31 having rotatably mounted therein casters 32. These plates are so positioned that when they are brought into engagement with the upper surfaces of their associated ground braces 13 the casters carried thereby project through openings 33 formed in the ground braces and have the lower portion of the periphery thereof extending below the lower faces of the ground braces for engagement with the ground or floor of the garage. In order that the pivoted plates may be held in this position I provide swinging latch members 34 which are engageable with the free ends of the plates to prevent movement thereof. It will, of course, be understood that when the plates 31 are released and swung upwardly the ground brace is dropped into engagement with the ground and movement of the hoist upon the casters is prevented. When the automobile is properly positioned with respect to the hoist the hooks 30 or the like are engaged with the axle and the crank 28 rotated to cause rotation of the shaft 22. As the shaft 22 is rotated the cables 20 are wound thereon drawing the axle toward the shaft 16 and elevating the associated end of the automobile. It is here pointed out that the mounting of the pulleys 19 upon the shaft is important as if these pulleys were fixed against longitudinal movement upon the shaft the change in angle due to shifting of the cables 20 as they wound upon the shaft 22 would soon cause the cables to leave the pulleys and engage against the shaft 16 interfering with their operation and causing considerable wear thereon.

It will be seen from the foregoing that a hoist constructed in accordance with my invention may be very cheaply and rapidly produced and may be placed upon the market at a very low cost as compared with those forms of automobile hoists with which I am familiar. It will furthermore be obvious that the device as hereinbefore set forth is capable of a considerable range of change and modification and I accordingly do not limit myself to such specific structure except as hereinafter claimed.

I claim:—

1. In an automobile hoist, spaced inclined channeled track members adapted to receive and guide the wheels of an automobile, brace members associated with said track members and supporting the upper ends thereof, a shaft journaled upon said brace members, a second shaft secured against rotation with relation to the brace members and carried by said brace members, said second shaft being arranged above the first named shaft, a pair of pulleys rotatable upon the last named shaft and shiftable longitudinally thereof, cables secured to the first named shaft and trained over said pulleys, means at the free ends of said cables for securing the same to the chassis of a vehicle, and means for rotating the first named shaft.

2. In an automobile hoist, spaced inclined channeled track members adapted to receive and guide the wheels of an automobile, brace members associated with said track members and supporting the upper ends thereof, a shaft journaled upon said brace members, a second shaft secured against rotation with relation to the brace members and carried by said brace members, said second shaft being arranged above the first named shaft, a pair of pulleys rotatable upon the last named shaft and shiftable longitudinally thereof, cables secured to the first named shaft and trained over said pulleys, means at the free ends of said cables for securing the same to the chassis of a vehicle, means for rotating the first named shaft, including a gear secured to the outer end of the first-named shaft, a stub shaft journaled in the adjacent brace, a pinion carried by the stub shaft and meshing with said gear, a bracket secured to the brace and engaging the pinion and gear to hold the same against movement in one direction, means for rotating said stub shaft, and means for locking said pinion against rotation.

In testimony whereof I hereunto affix my signature.

FRED C. CHRISTMAN.